Nov. 10, 1925. 1,561,015
W. A. PAINTER
FLUX BRUSH
Filed Oct. 20, 1924 2 Sheets-Sheet 2
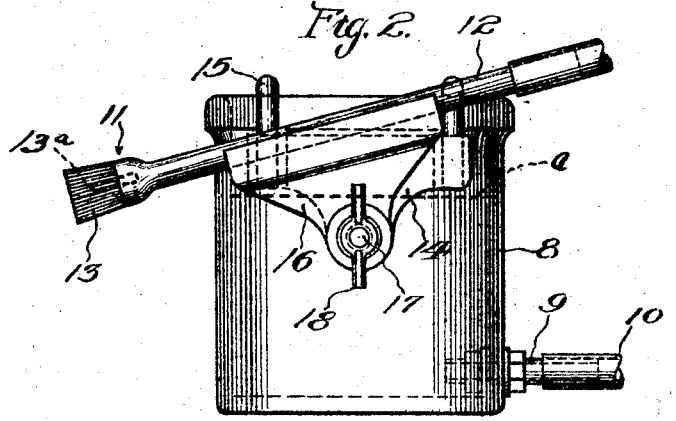
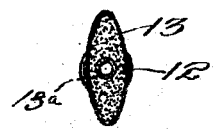
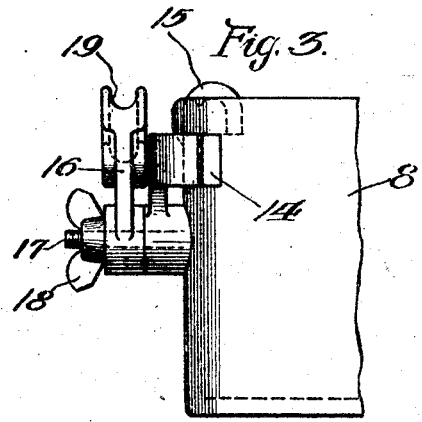
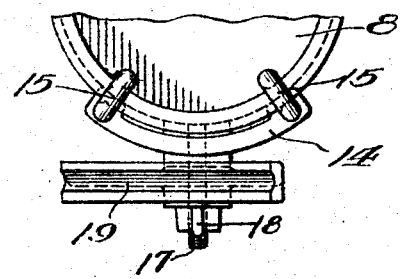
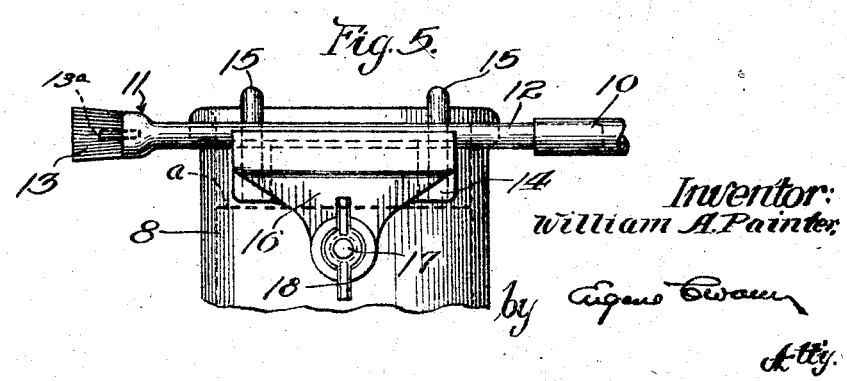
Inventor:
William A. Painter,
by Eugene Ewan
Atty.

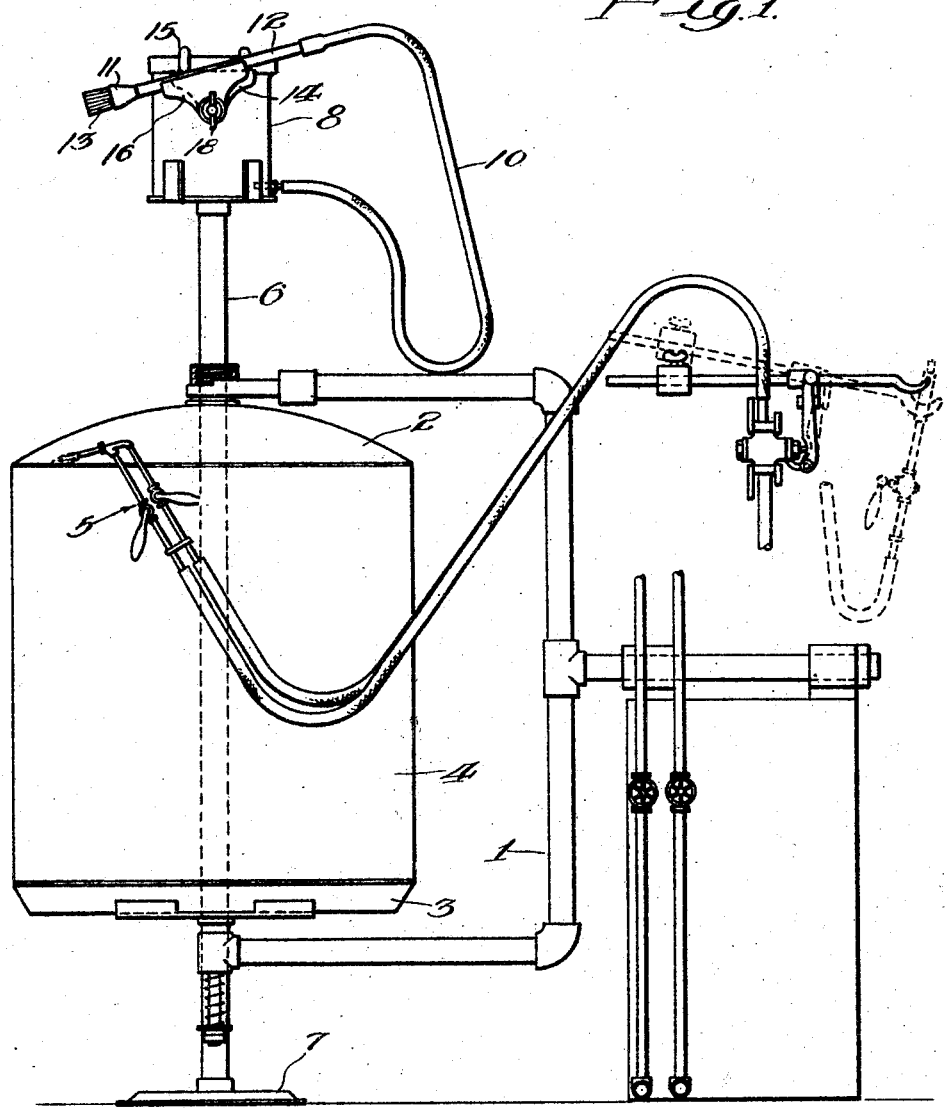

Patented Nov. 10, 1925.

1,561,015

UNITED STATES PATENT OFFICE.

WILLIAM A. PAINTER, OF DETROIT, MICHIGAN, ASSIGNOR TO McCORD RADIATOR & MFG. CO., OF DETROIT, MICHIGAN, A CORPORATION OF MAINE.

FLUX BRUSH.

Application filed October 20, 1924. Serial No. 744,698.

*To all whom it may concern:*

Be it known that I, WILLIAM A. PAINTER, a citizen of the United States, residing at Detroit, in the county of Wayne and State of Michigan, have invented new and useful Improvements in Flux Brushes, of which the following is a specification.

This invention relates to a fountain brush assembly for applying soldering flux to parts to be soldered.

The invention has particular reference to a fountain brush assembly for use in connection with soldering parts of motor vehicle radiators during the making of the latter.

The main object of the invention is to provide a brush assembly which feeds flux by gravity to the brush as the latter wipes flux over the parts to be soldered, and thus avoid the wasteful method as heretofore practiced in dipping a brush or swab into the flux solution and then wiping the brush or swab over the parts to be soldered, with the consequent application of more flux to the parts than required and the waste of flux by allowing it to drip from the swab in carrying the latter to and from the flux container.

Another object of my invention is to have a pivoted brush support in the assembly, so that the brush may be hung up when not in use and also be capable of being adjusted from a horizontal to an inclined position to regulate the amount of flux supplied to the brush when hung up on such support.

Other and further objects of my invention will appear from the following specification, taken in connection with the accompanying drawings, in which—

Fig. 1 is an elevational view of a fountain brush assembly of my invention and shown in connection with a blow torch and holding frame of a radiator soldering equipment;

Fig. 2 is an enlarged front view of the flux container showing its brush support;

Fig. 3 is a side view of the container and its brush support, the container being broken away;

Fig. 4 is a top plan view of said parts;

Fig. 5 is a side view showing the support adjusted to hold the brush in a horizontal position, as distinguished from the downwardly inclined position of Fig. 2; and Fig. 6 is a sectional view through the brush.

In Fig. 1, 1 indicates a holding frame for a radiator assembly while soldering the upper and lower tanks 2, 3 to the head sheets of the core 4 by the use of a blow torch 5, the cut-off valve feature of which constitutes the subject-matter of my copending application Serial No. 744,697, filed October 20, 1924.

In association with this soldering equipment, the fountain brush assembly of my invention is used. This assembly includes an upright stand 6 in the form of a pipe or rod with a supporting base 7 at its lower end and a container or pot 8 at its upper end, as shown in Fig. 1.

The container 8 is provided at or adjacent its lower end with an outlet pipe fitting or nipple 9, over which is slipped an end of a rubber hose 10. At the other end of the hose is the brush 11. The brush has a tubular metal stem or handle 12 over one end of which is slipped the other end of the hose. The opposite end of the tube or handle 12 is enlarged to receive a pack of bristles 13 clamped around a small tube section 13ª arranged within the center of the bristle pack, as shown in Fig. 6.

In making the brush, the outer end of the handle 12 is circular and the bristle pack is inserted therein with the tube 13ª in the center. Then the outer end of the handle is flattened to compress the bristle pack tightly together and about the tube 13ª to prevent the flux liquid flowing through the bristles except at the tube 13ª.

When the brush is lower than the level *a* of the flux in the container 8, the liquid flows to the brush 11 and, in wiping the brush around the edges of the seams between the tanks 2 and 3 and the interposed core 4, a layer of flux is applied to the parts for soldering. With the flux being supplied to the parts through the interior of the brush, it is not necessary for the operator to dip the brush into the vessel containing the flux and apply it in the wasteful manner as heretofore.

When the brush is not in use, it is hung up above the level $a$ of the flux in the container 8 so as to stop the flow of flux to the brush. I have shown in the drawings a supporting fixture for the brush applied to the container 8. This fixture includes a hanger 14 suspended on the outside of the container 8 by a number of members 15, which have hooked ends to hook over the upper edge of the container, as shown in Figs. 2 to 5. The body portion of the fixture 14 is curved to conform to the curvature of the container 8 when the latter is circular, as shown in Fig. 4, and the hook members 15 are at the ends of this hanger.

The brush holder 16 is mounted on a bolt 17 carried by and extending outwardly from the hanger 14 and, by a wing nut 18, the brush holder 16 is held in any of its positions of adjustment around said bolt. This brush holder 16 has an elongated upper end in which is a groove or channel 19 to receive the tube or handle 12 of the brush 11, as shown in Figs. 1, 2, and 5. When the brush rests in the groove, it is in a position above the level of the flux liquid in the container 8, and in this holder the brush is placed after each wiping operation of the parts to be soldered.

Adjusting the brush holder 16 into a position to hold the brush horizontal, as shown in Fig. 5, stops the flow of flux to the brush bristles from the tube 10 and, should the brush then become too dry and not present enough flux to the parts being wiped, the holder 16 may be adjusted to hold the brush in the downwardly inclined position shown in Figs. 1 and 2, so that the flux contained in the tube 10 and handle 12 will flow by gravity into the brush bristles 13 while the brush is not in use. By this means the brush may be kept as moist as required for effective soldering purposes.

While I have shown and described herein a fountain brush assembly of my invention, it is of course to be understood that the details of construction and arrangement of parts may be variously changed and modified without departing from the spirit and scope of my invention.

I claim as my invention:

1. The combination with a soldering stand for a radiator core and tank assembly, of a flux container supported above said stand, a fountain brush, a flexible tube connecting the brush with the container for supplying flux by gravity to the brush while wiping flux on the parts of the radiator to be soldered, and means for holding the brush when not in use in a position to check the flux flow thereto.

2. The combination with a soldering stand for a radiator core and tank assembly, of a flux container above the stand, a fountain brush, a flexible tube connecting the brush with the container for supplying flux by gravity to the brush while wiping flux on the parts of the radiator to be soldered, and means on the container for supporting said brush when not in use above the flux level in the container to check flux flow to the brush.

3. The combination with a soldering stand for a radiator core and tank assembly, of a flux container above the stand, a fountain brush, a flexible tube connecting the brush with the container for supplying flux by gravity to the brush on applying flux to the parts of the radiator to be soldered, and means on the container for supporting the brush when not in use above the flux level in the container to check the flux flow to the brush, said means being adjustable so that the brush may be supported in an inclined or a horizontal position.

4. An assembly of the character described, comprising an upright stand, a flux container thereon and having a bottom outlet, a fountain brush, a flexible tube connecting the brush with said outlet, and a brush holder carried by the container for supporting the brush when not in use and holding the latter above the flux level in the container to check flux flow to the brush.

5. An assembly of the character described, comprising an upright stand, a flux container thereon and having a bottom outlet, a fountain brush, a flexible tube connecting the brush with said outlet, and a pivoted brush holder carried by the container to hold the brush when not in use above the flux level in the container to check the flow of flux to the brush, said holder being adjustable about its pivot to support the brush in an inclined or a horizontal position.

6. An assembly of the character described, comprising an upright stand, a flux container thereon having a bottom outlet, a fountain brush, a flexible tube connecting the brush with said outlet, and a brush holder hooked over the upper edge of the container and having an adjustable part to support the brush when not in use, said part being capable of adjustment for holding the brush in an inclined or a horizontal position.

7. The combination with a flux container having a bottom outlet, of a fountain brush, a flexible tube connecting the brush with said outlet, a hanger with hook members engaging over the upper edge of the container for holding the hanger thereon, and a brush holder adjustably pivoted to said hanger and having a brush supporting portion at its upper edge.

8. The combination with a flux container having a bottom outlet, of a fountain brush, a flexible tube connecting the brush with said outlet, a hanger with hook members engaging over the upper edge of the container, an outwardly projecting bolt carried by said hanger, a brush holder on the bolt and adapted to be clamped in adjusted positions about the same, said member having a grooved upper edge to support said brush when the latter is not in use.

In testimony that I claim the foregoing as my invention, I affix my signature, this 4th day of October, 1924.

WILLIAM A. PAINTER.